W. H. OLDHAM.
AIR AND FUEL SPRAYING DEVICE FOR ENGINES.
APPLICATION FILED JUNE 8, 1916.
1,220,674.
Patented Mar. 27, 1917.
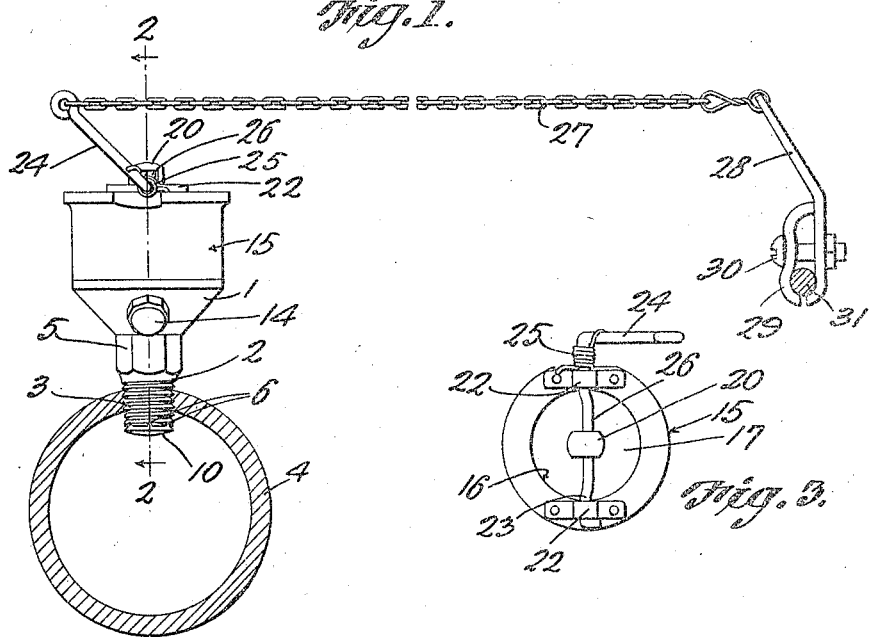
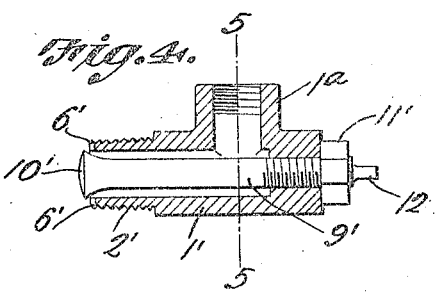
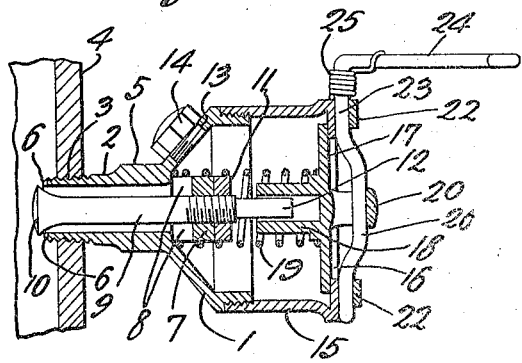
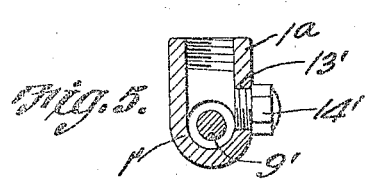
Witnesses
W. H. Oldham, Inventor
by Attorneys

UNITED STATES PATENT OFFICE.

WILLIAM H. OLDHAM, OF ELKTON, KENTUCKY.

AIR AND FUEL SPRAYING DEVICE FOR ENGINES.

1,220,674.   Specification of Letters Patent.   Patented Mar. 27, 1917.

Application filed June 8, 1916. Serial No. 102,547.

*To all whom it may concern:*

Be it known that I, WILLIAM H. OLDHAM, a citizen of the United States, residing at Elkton, in the county of Todd and State of Kentucky, have invented a new and useful Air and Fuel Spraying Device for Engines, of which the following is a specification.

The present invention appertains generally to internal combustion engines, and relates more especially to an air supplying device for the intake manifold or carbureter of an explosion engine.

It is the object of the invention to provide a novel and improved yet simple and inexpensive device attachable to the intake manifold or carbureter of an engine and operable for admitting a secondary or auxiliary supply of air to admix with the carbureted air, whereby to provide a more perfect combustible mixture, and to provide for economy in the use of fuel.

Another object of the invention is the provision of an air supplying device having novel means for admitting or spraying the air within the intake manifold or carbureter, whereby to break up the mixture into a fine mist.

A further object of the invention is the provision in a device of the nature indicated, means whereby the flow of air is controlled to be in proportion to the suction, and means for adjusting the device for different engines whereby the maximum flow of air is proportional to the maximum need of air in the mixture.

A still further object of the invention is the provision of novel means for cutting off the flow of air under certain conditions, as when the spark is retarded.

It is also the object of the invention to provide a device having the characteristics above noted which is comparatively simple, consisting of but few parts, and which can be readily applied to various engines to perform its duty in a satisfactory and practical manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the present invention.

The invention is illustrated in the accompanying drawings, wherein:—

Figure 1 is a plan view of the device.

Fig. 2 is a sectional view taken on the line 2—2 of Fig. 1.

Fig. 3 is an end view.

Fig. 4 is a longitudinal median section of a modified form, and

Fig. 5 is a cross section thereof taken on the line 5—5 of Fig. 4.

The preferred form of the invention, which is illustrated in Figs. 1, 2 and 3, embodies a funnel-shaped body 1, the spout or nipple 2 of which is threaded, as at 3, or otherwise formed for engagement with the intake manifold or carbureter 4 of an internal combustion engine so as to project into the air passage. The nipple 2 has a wrench engaging portion 5 whereby the body can be readily applied and removed, and the end of the nipple which projects into the manifold or carbureter is provided with an annular series of notches 6. The body 1 is provided at the basal end of the nipple 2 with a stud 7 projecting centrally within the body, and said stud has opposite openings 8 establishing communication between the bore of the nipple and the chamber within the body. A longitudinal stem 9 is disposed axially within the nipple 2 spaced from the walls thereof and one end thereof is engaged threadedly through the stud 7, whereby the stem 9 can be adjusted longitudinally by rotating it, that end of the stem 9 remote from the boss 7 has a conical or flared valve 10, the largest portion of which is of the same or larger diameter than the bore of the nipple 2. The larger portion of the valve 10 is spaced from the end of the nipple 2, to provide an annular space for the flow of air from the nipple into the manifold or carbureter, and this space can be increased or decreased by adjusting the stem 9, whereby to control the maximum flow of air from the nipple into the manifold. This enables the device to be adjusted for various engines, simply by adjusting the stem 9 carrying the valve 10. The valve 10 also serves as a deflector or spreader for spreading the air which flows from the nipple in various directions. A jam or lock nut 11 is threaded upon the stem 9 to seat against the stud 7 for holding the stem in any adjusted position, and the end of the stem 9 remote from the valve 10 has a reduced extension 12.

The body 1 can be provided with an aperture 13, normally closed by a screw plug or other closure 14, and if desired, the plug 14 can be removed, for the attachment of any suitable priming device, whereby fuel can be injected through the medium of the present device into the carbureter or manifold for priming the engine. If this priming device is not used, the aperture 13 is normally closed by the plug or closure 14.

A cap 15 has its rim threadedly or otherwise detachably engaged with the rim of the body 1, to provide an air chamber within said body and cap, and the cap is provided with a central air inlet opening 16. The flow of air through the opening 16 is controlled by a disk valve 17 within the cap 15 and seatable outwardly against the cap around the opening 16. Said valve 17 has a central sleeve 18 projecting therefrom toward the body 1 and loosely surrounding the extension 12 of the stem 9 to guide the valve 17 for movement to and from its seat. A coiled wire expansion spring 19 surrounds the sleeve 18 and stud 7, and seats against the body 1 and valve 17, thereby tending to seat or close said valve. The valve 17 is provided centrally thereof with an outstanding loop or slotted member 20, whereby the movement of the valve 17 can be controlled. This is accomplished by a rock shaft 23 extending diametrically across the face of the cap 15 and across the opening 16 thereof, and journaled in bearings 22 with which the cap 15 is provided at opposite sides of its opening 16. Said shaft 23 projects through the loop 20, and is provided at one end with an arm 24. A coiled wire torsional spring 25 is disposed upon the shaft 23 and has one end engaged with the cap and its other end engaged with the arm 24, thereby tending to rotate the shaft 23 in one direction. The shaft 23 is provided between the bearings 22 and bridging the opening 16 with an offset portion 26 within the loop 20, and the parts are so arranged, that when the shaft 23 is rotated under the influence of the spring 25 to a certain position, the offset portion 26 will move into or almost into a plane in which the axis of the valve 17 lies, whereby to provide a lock to prevent the valve 17 from being unseated. The offset portion 26 in being swung away from the cap by the spring 25, moves the valve 17 against the seat and holds it seated, even against the suction which extends from the manifold into the casing of the present device provided by the body 1 and cap 15.

It is preferable to connect the arm 24 with the spark controlling means of the engine. Thus, the arm 24 can be connected by a chain 27 or other suitable connection with an arm 28. Said arm 28 has a coöperating clamping member 29 providing a clamp therewith, said clamping member 29 being connected with the clamping portion of the arm 28 by a clamping bolt 30, whereby the arm 28 can be readily applied to and clamped upon the spark controlling rod 31, although it is to be understood that the arm 24 can be connected to any other suitable portions of various spark controlling means. The arm 28 is so arranged, that when the spark is advanced, the arm 28 is swung in such a direction as to swing the arm 24 against the tension of the spring 25, thereby moving the offset portion 26 toward the cap 15, and permitting the valve 17 to unseat. The farther the spark is advanced, the farther will the portion 26 be moved toward the cap 15, and the farther can the valve 17 be opened, to increase the flow of air proportionately. However, when the spark is retarded, as when starting the engine, the arm 28 is swung (to the left as seen in Fig. 10), thereby slackening the chain 27, and permitting the arm 24 to be swung by the spring 25 so that the offset portion 26 is moved to "locking" position to hold the valve 17 seated. This prevents the flow of air into the manifold from the present device when starting the engine, whereby the richest possible mixture can be had. When the spark controlling rod 31 is set in its usual running position, the offset portion 26 is in an intermediate position, thereby permitting the valve 17 to open a limited amount, and when the spark is retarded, the valve 17 is moved toward or against its seat, while if the spark is advanced from normal, the valve 17 is permitted to open farther by the suction.

It will be evident that the chain 27 or other connection with the arm 24 can be operated from the dash, steering post, or other point of an automobile, in the absence of spark controlling means, or when it is not desired to connect the present device with such spark controlling means.

It is evident that when the engine is in operation, the suction will extend from the manifold into the nipple 2 and casing 1—15, and the suction will unseat the valve 17 when it is free to do so, thereby drawing in air, the air flowing through the openings 8 into the nipple 2, and thence past the valve or spreader 10 into the manifold. The spreader 10 serves to spread the air in all directions as it enters the manifold, thereby breaking up the fuel mixture into a fine mist, just before entering the combustion chambers of the engine, and resulting in a material saving of fuel, and increased power and flexibility of the motor. The notches 6 assist in the breaking up of the fuel by providing diverging streams of air, especially when the valve 10 is adjusted close to the end of the nipple 2. The device can be applied to the intake manifold or carbureter to any suitable point, and it is only necessary to tap the manifold or carbureter for the reception of the nipple 2.

The modification illustrated in Figs. 4 and 5, is adapted especially for attaching other air intake devices or inspirators to the intake manifold or carbureter. The modified form embodies a small tubular casing 1′ one terminal of which provides a nipple 2′ adapted to be threaded into or otherwise engaged with the manifold or carbureter, and provided at its end with notches 6′. A longitudinal stem 9′ disposed axially within the casing 1′ spaced from its wall is threaded through the closed end of the casing 1′ remote from the nipple 2′ and is provided at its remote end with a conical or flared valve or spreader 10′ coöperable with the notched end of the nipple 2′ to provide the air spray, as above pointed out. A lock nut 11′ is threaded upon the stem 9′ to seat against the closed end of the casing 1′, and said stem has a wrench engaging extension 12′, whereby the stem can be adjusted conveniently. The casing 1′ has a radially extending branch or arm 1ª for the attachment of any suitable air intake or inspirator device, whereby the present device can be used as a medium for attaching such a device to the manifold or carbureter, and to provide the air spray. One side of the casing 1′ can have an aperture 13′ for the connection of a priming device, as above indicated, and if said device is not used, said aperture can be closed by a screw plug 14′.

Having thus described the invention, what is claimed as new is:

1. A device of the character described embodying a funnel-shaped body having a nipple and a stud at the basal end of the nipple within the body, said stud having an opening leading to the nipple for the flow of air therethrough, a stem extending through the stud and having a valve coöperable with the nipple for controlling the flow of air therefrom, and a valve movable upon said stem for controlling the flow of air through the mouth of the body.

2. A device of the character described comprising a funnel-shaped body having a nipple and a stud at the basal end of the nipple projecting within the body, said stud having an opening extending to the nipple for the passage of air, a stem threadedly engaged through the stud and projecting within the nipple, said stem having a valve coöperating with the nipple for controlling the flow of air and spreading it, said stem having an extension, a cap engaged with the body and having a central opening, a valve seatable outwardly against the cap to close the opening thereof, the second mentioned valve having a sleeve slidable upon said extension, and a coiled expansion spring surrounding said stud and sleeve and confined between the body and second mentioned valve.

3. The combination with the spark controlling means of an engine, of air admitting means for the intake manifold or carbureter thereof, having a valve adapted to be unseated by suction, and means operatively connected with the spark controlling means and coöperable with said valve for preventing or limiting the unseating movement of said valve.

4. A device of the character described embodying a spring closed valve adapted to be opened by suction, and a controllable shaft having an offset portion, said valve having means connected thereto engaging said offset portion, said means of said valve and offset portion being coöperable whereby the shaft in being rotated to different positions will serve to either prevent or limit the unseating movement of the valve.

5. A device of the character described embodying air admitting means for an intake manifold or carbureter of an engine having a spring closed valve adapted to be opened by air suction, a shaft having an offset portion, said valve having a slotted member engaging said offset portion, a spring tending to rotate said shaft in one direction whereby the offset portion moves the valve toward its seat, and means connected to said shaft for rotating it against the tension of said spring to permit the valve to unseat.

6. A device of the character described embodying air admitting means for an internal combustion engine having a spring closed valve adapted to be opened by air suction, means operatively connected with the valve for preventing or limiting the unseating movement thereof, spring means tending to move said means to a position to prevent the unseating movement of the valve, and means connected to the second mentioned means for moving it against the tension of the spring means.

7. A device of the character described comprising a casing having an opening, a valve seatable outwardly against the casing to close said opening and having an outstanding slotted member, and a rock shaft carried by the casing and having an offset portion extending through said slotted member, the offset portion when moved away from the casing serving to move the valve toward its seat.

8. A device of the character described comprising a casing having an air inlet opening, a valve within the casing seatable thereagainst to close said opening, said valve having an outstanding slotted member, a rock shaft carried by the casing and extending across said opening, said rock shaft having an offset portion extending through said slotted member and which when swung away from the casing serves to move the valve toward its seat, spring means for rotating said shaft to move said offset portion away from the casing, and means operatively connected with the shaft for moving it against the tension of said spring means.

9. The combination with the spark controlling means of an internal combustion engine, of an air inlet device for the intake manifold or carbureter of said engine having a spring closed valve adapted to be opened by air suction, means coöperable with said valve for preventing or limiting the unseating movement thereof, spring means for moving said means to a position to prevent the unseating movement of the valve, and a flexible connection between the spark controlling and second mentioned means whereby when the spark is retarded, said flexible connection is slackened.

In testimony that I claim the foregoing as my own, I have hereto affixed my signature in the presence of two witnesses.

WILLIAM H. OLDHAM.

Witnesses:
J. C. PENICK, Jr.,
H. W. WEATHERS.